US006583230B2

(12) United States Patent
Hahn et al.

(10) Patent No.: US 6,583,230 B2
(45) Date of Patent: Jun. 24, 2003

(54) HYDROGENATED BLOCK COPOLYMERS HAVING VARYING SIZES OF HYDROGENATED VINYL AROMATIC BLOCKS

(75) Inventors: Stephen F. Hahn, Midland, MI (US); Glenn H. Fredrickson, Santa Barbara, CA (US); Cora M. Leibig, Midland, MI (US); Molly T. Reinhardt, Kawkawlin, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/040,780

(22) Filed: Oct. 31, 2001

(65) Prior Publication Data
US 2002/0150715 A1 Oct. 17, 2002

Related U.S. Application Data
(60) Provisional application No. 60/255,748, filed on Dec. 13, 2000.

(51) Int. Cl.$^7$ .................................................. C08F 8/04
(52) U.S. Cl. .................. 525/338; 525/332.9; 428/64.4; 428/65.3
(58) Field of Search ............... 525/338, 332.9; 428/64.4, 65.3

(56) References Cited

U.S. PATENT DOCUMENTS 3,333,024 A    7/1967   Haefele et al.
3,431,323 A    3/1969   Jones
3,598,886 A    8/1971   Hoeg et al.
4,911,966 A    3/1990   Murayama et al.
6,350,820 B1 * 2/2002   Hahnfeld et al. ........... 525/339

FOREIGN PATENT DOCUMENTS

| EP | 0 289 917 | 4/1988 |
|----|-----------|--------|
| GB | 2 207 679 | 2/1989 |
| GB | 2 225 330 | 5/1990 |
| WO | WO 00/56783 | 9/2000 |
| WO | WO 00/77054 | 12/2000 |

OTHER PUBLICATIONS

Macromolecultes 1994, 27, 3611–3618, Gehlsen, et al., "Conformational Asymetry In Poly(Vinylcyclohexane) Containing Diblock Copolymers".

Thermoplastic Elastomers, Chapter 14, Ed. N.R. Legge, et al., Hanser Publishers, New York, 1987.

Bates, et al., USSN 09/695,041, filed Oct. 24, 2000, "Hydrogenated Block Copolymer Compositions".

* cited by examiner

Primary Examiner—James J. Seidleck
Assistant Examiner—Olga Asinovsky

(57) ABSTRACT

The present invention is a composition comprising an alternating hydrogenated block copolymer having at least two hydrogenated vinyl aromatic polymer blocks and at least one conjugated diene polymer block, wherein the number average molecular weights (Mn) of each block can be different.

12 Claims, No Drawings

HYDROGENATED BLOCK COPOLYMERS HAVING VARYING SIZES OF HYDROGENATED VINYL AROMATIC BLOCKS

CROSS REFERENCE STATEMENT

This application claims the benefit of U.S. Provisional Application No. 60/255,748, filed Dec. 13, 2000.

BACKGROUND

The present invention relates to hydrogenated block copolymers. In particular, the invention relates to hydrogenated block copolymers prepared from vinyl aromatic and conjugated diene monomers.

Copending applications Ser. No. 09/695,041, filed Oct. 24, 2000, disclose pentablock and other multi-block hydrogenated copolymers. However, these polymers typically have the structure ABABA, wherein A is a hydrogenated vinyl aromatic polymer block, B is a hydrogenated conjugated diene block and the copolymer is symmetrical in molecular weights, that is all A blocks have the same molecular weight and all B blocks have the same molecular weight.

Fully hydrogenated block copolymers prepared from vinyl aromatic and conjugated diene monomers, wherein both blocks are substantially saturated, are well known in the art. U.S. Pat. No. 3,333,024 and U.S. Pat. No. 3,431,323 disclose hydrogenated triblock (ABA) copolymers of vinyl aromatic and conjugated diene polymers having a 20 to 30 percent hydrogenation level and improved tensile properties, when compared to their non-hydrogenated counterparts. However, such copolymers containing very low molecular weight hydrogenated polystyrene blocks, for example 4,000, have low heat resistance and do not afford rigid compositions with good physical properties. U.S. Pat. No. 3,598,886 discloses hydrogenated vinyl substituted aromatic hydrocarbon-conjugated diene block copolymers having less than 3 percent aromatic unsaturation, however the compositions disclosed do not have a good balance of physical properties and processability. Moreover, *Thermoplastic Elastomers*, Chapter 14, Ed. N. R. Legge, et al., Hanser Publishers, New York, 1987 discloses that fully hydrogenated block copolymers have generally poor physical properties at only slightly elevated temperatures.

U.S. Pat. No. 4,911,966 issued to Mitsubishi discloses hydrogenated vinyl aromatic polymers and copolymers and their use in optical media applications. However, the broad composition disclosed suffer from numerous disadvantages including high birefringence, poor processability and poor dimensional stability in such applications.

Therefore, it remains desirable to obtain a hydrogenated block copolymer composition prepared from a vinyl aromatic and a conjugated diene monomer having improved physical properties, retention of these properties at elevated temperatures, and good birefringence, processability and dimensional stability for use in thin wall injection molding applications.

SUMMARY OF THE INVENTION

The present invention is a composition comprising an alternating hydrogenated block copolymer having at least two blocks of hydrogenated vinyl aromatic polymer and at least one conjugated diene polymer block, wherein the number average molecular weights (Mn) of each block can be different.

In one aspect, the present invention is a composition comprising a hydrogenated pentablock copolymer prepared by hydrogenating a pentablock copolymer produced from at least one vinyl aromatic monomer and at least one conjugated diene monomer, wherein the hydrogenated pentablock copolymer has a total number average molecular weight ($Mn_t$) of from 40,000 to 70,000 and is of the structure ABA'B'A", and wherein each vinyl aromatic polymer block, herein referred to as A type block (A, A', A") has a $Mn_a$ of from 8,700 to 21,000 and is hydrogenated to greater than 90 percent, and each conjugated diene polymer block, herein referred to as B type block (B, B') has a $Mn_b$ of from 2,000 to 12,500, further characterized in that the total amount of type B block (B, B') is from 10 to 35 weight percent of the copolymer based on the combined weights of all blocks, and are hydrogenated to greater than 95 percent, while A type blocks (A, A', A") are hydrogenated to at least 90 percent. Additionally, the number average molecular weights (Mn) of the A type blocks are such that at least one A type block varies significantly in Mn from the other A type block(s).

The hydrogenated copolymers of the present invention having these Mn, block content and hydrogenation characteristics, have superior properties and processability characteristics when compared to other block and pentablock copolymers, especially in thin wall injection molding applications such as optical media discs. The hydrogenated copolymers of the present invention also exhibit higher resistance to yield, and improved toughness.

The hydrogenated copolymers of the present invention are advantageously used in thin wall injection molded applications such as optical media discs due to their excellent processability, birefringence, dimensional stability and other physical properties.

DESCRIPTION OF THE PREFERRED EMBODIMENTS

The present invention relates to a composition comprising an alternating hydrogenated pentablock copolymer, wherein the copolymer is prepared by hydrogenating a pentablock copolymer produced from at least one vinyl aromatic monomer and at least one conjugated diene monomer, having the structure ABA'B'A", wherein the A type block is a hydrogenated polymerized vinyl aromatic monomer, herein referred to as hydrogenated vinyl aromatic polymer, and the B type block is a hydrogenated polymerized conjugated diene monomer, herein referred to as a hydrogenated conjugated diene polymer.

The vinyl aromatic monomer is typically a monomer of the formula:

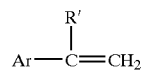

wherein R is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The pentablock copolymer can contain more than one specific polymerized vinyl aromatic monomer. For instance, the pentablock copolymer can contain a polystyrene block and a poly-alpha-methylstyrene block. The hydrogenated vinyl aromatic polymer block may also be a copolymer of a vinyl aromatic wherein the vinyl aromatic portion is at least 50 weight percent of the copolymer.

The conjugated diene monomer can be any monomer having 2 conjugated double bonds. Such monomers include for example 1,3-butadiene, 2-methyl-1,3-butadiene, 2-methyl-1,3 pentadiene, isoprene and similar compounds, and mixtures thereof. The pentablock copolymer can contain more than one specific polymerized conjugated diene monomer. In other words, the pentablock copolymer can contain a polybutadiene block and a polyisoprene block.

The conjugated diene polymer block can be chosen from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. The conjugated diene polymer block may also be a copolymer of a conjugated diene, wherein the conjugated diene portion of the copolymer is at least 50 weight percent of the copolymer.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in *Block Copolymers-Designer Soft Materials*, PHYSICS TODAY, February, 1999, pages 32–38.

The hydrogenated pentablock copolymer of the present invention typically contains from 65 to 90 weight percent of a hydrogenated vinyl aromatic polymer, for example polyvinylcyclohexane or PVCH block, preferably from 70 to 85 percent, based on the total weight of the hydrogenated pentablock copolymer.

The hydrogenated pentablock copolymers of the present invention typically contain from 10 to 50 weight percent of a hydrogenated conjugated diene polymer block, preferably from 11, more preferably from 13, and most preferably from 15 to 45 weight percent, typically to 40, preferably to 35, more preferably to 33, and most preferably to 30 percent, based on the total weight of the hydrogenated pentablock copolymer.

The total number average molecular weight (Mn) of the hydrogenated pentablock copolymers of the present invention is typically from 40,000, preferably from 42,000, more preferably from 46,000 and most preferably from 50,000 to 120,000, preferably to 100,000 and most preferably to 70,000. Number average molecular weight (Mn) as referred to throughout this application is determined using gel permeation chromatography (GPC). The molecular weight of the hydrogenated pentablock copolymer and properties obtained are dependent upon the molecular weight of each of the hydrogenated polymeric blocks.

Typical number average molecular weight values for each hydrogenated vinyl aromatic polymer block are from 10,000, preferably from 11,000 to 50,000, preferably to 40,000, more preferably to 30,000 and most preferably to 20,000. It should be noted that good properties are obtained at hydrogenated vinyl aromatic polymer molecular weights which are lower than the entanglement molecular weight of the hydrogenated vinyl aromatic polymer. It is generally accepted in the art that the weight average molecular weight of a polymer must far exceed the entanglement molecular weight in order to achieve acceptable properties. The entanglement molecular weight of a polymer is associated with the chain length required for a given polymer to show a dramatic increase in melt viscosity due to chain entanglements. The entanglement molecular weights for many common polymers have been measured and reported in *Macromolecules*, 1994, Volume 27, page 4639. It is commonly observed for glassy polymers that maximum values of strength and toughness are achieved at about 10 times the entanglement molecular weight (see for instance Styrene Polymers in the Encyclopedia of Polymer Science and Engineering, 2nd edition, Volume 16, pages 62–71, 1989). The entanglement molecular weight is approximately 38,000 for polyvinylcyclohexane. We have determined that an optimum balance of properties and processability can be obtained at hydrogenated vinyl aromatic polymer block molecular weights (Mn) of less than 0.6 times the entanglement molecular weight of a hydrogenated vinyl aromatic polymer. The molecular weight of each hydrogenated conjugated diene polymer block is typically lower than that of the hydrogenated vinyl aromatic polymer block when a high modulus, rigid polymer is desired. The molecular weight of each hydrogenated diene polymer block is typically from 2,000, preferably from 2,500, more preferably from 3,000 and most preferably from 3,750 to 20,000, preferably to 15,000, more preferably to 12,000 and most preferably to 10,500.

It is important to note that each individual block of the hydrogenated pentablock copolymer has its own distinct Mn. In other words, for example, the hydrogenated vinyl aromatic polymer blocks within the hydrogenated pentablock copolymer of the present invention each have a different Mn.

It has been surprisingly discovered that advantageous properties can be obtained by selecting specific molecular weights for the A type blocks of hydrogenated vinyl aromatic polymer. This can be achieved in a number of different configurations. Preferably, the block copolymers comprise:

1) A midblock of at least 1.5 times the Mn of the endblocks, the endblocks being the same or similar Mn; or 2) Endblocks of at least 1.5 times the midblock Mn, the endblocks also being the same or similar Mn.

The terms 'same or similar Mn' means Mn's which do not differ by more than 25 percent, preferably 20 percent, more preferably 15 percent and most preferably 10 percent.

Typically, the differences in Mn which occur between the A type blocks will be at least 1.5 times, generally at least 2 times, preferably at least 2.5 times, more preferably at least 3 times and more preferably at least 4 times the Mn of the smaller A type block.

Methods of making block copolymers are well known in the art. Typically, block copolymers are made by anionic polymerization, examples of which are cited in *ANIONIC POLYMERIZATION: PRINCIPLES AND PRACTICAL APPLICATIONS*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the pentablock copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. The coupled structure achieved by this method is considered to be the functional equivalent of the ABABA pentablock copolymer structure. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. No. 4,200,718 and U.S. Pat. No. 4,196,154 which are herein incorporated by reference.

After preparation of the pentablock copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024 both of which are incorporated herein by reference). Additionally, soluble, homogeneous catalysts such as those prepared from combinations of transition metal salts of 2-ethylhexanoic acid and alkyl lithiums can be used to fully saturate block copolymers, as described in *Die Makromolekulare Chemie*, volume 160, pp 291, 1972. The copolymer hydrogenation can also be achieved using hydrogen and a heterogeneous catalyst such as those described in U.S. Pat. No. 5,352,744, U.S. Pat. No. 5,612,422 and U.S. Pat. No. 5,645,253 which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that it contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having a diameter in the range of from 500 to 3,000 angstroms.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284–83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 m²/g and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *STUDIES IN SURFACE SCIENCE AND CATALYSIS, SUCCESSFUL DESIGN OF CATALYSTS*, V. 44, pg. 146–158, 1989 and *APPLIED HETEROGENEOUS CATALYSIS*, pgs. 75–123, Institute Francais du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 weight percent based on the total weight of the silica supported catalyst. Preferable amounts are from 2 to 8 weight percent, more preferably 0.5 to 5 weight percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The hydrogenation reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include, but are not limited, to hydrogen gas, hydrazine and sodium borohydride. In a preferred embodiment, the hydrogenating agent is hydrogen gas.

The level of hydrogenation of the pentablock copolymer of the present invention is preferably greater than 95 percent of the conjugated diene polymer block and greater than 90 percent of the vinyl aromatic polymer block segments, more preferably greater than 99 percent of the conjugated diene polymer block and greater than 95 percent of the vinyl aromatic polymer block segments, even more preferably greater than 99.5 percent of the conjugated diene polymer block and greater than 98 percent of the vinyl aromatic polymer block segments, and most preferably greater than 99.9 percent of the conjugated diene polymer block and 99.5 percent of the vinyl aromatic polymer block segments. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

The following examples are set forth to illustrate the present invention and should not be construed to limit its scope. In the examples, all parts and percentages are by weight unless otherwise indicated.

The amount of hydrogenation is measured using UV-VIS spectroscopy as described previously.

Mn is an absolute molecular weight measured by gel permeation chromatography, unless otherwise specified.

EXAMPLE PREPARATION

I) General Procedure for Preparing Block Copolymers

Sequential Polymerization of Pentablock Copolymer

A mixture of 386 Kg of cyclohexane containing approximately 8–15 weight percent isopentane is added to a 1136 liter stirred reactor under nitrogen atmosphere. The reactor is blanked by adding 0.5 Kg of a cyclohexane solution which is 0.0979 molar in low molecular weight polystyryl lithium. To this mixture is added 1.08 liters of a 1.4M solution of sec-butyllithium in cyclohexane. The solution is heated to approximately 65° C. and styrene monomer is added, followed by a 34 Kg hydrocarbon solvent purge of the styrene line. After 20 minutes of polymerization, butadiene monomer is added at a temperature of about 70° C., followed by 34 Kg of hydrocarbon solvent which is followed immediately by another styrene addition. After another 20 minutes, a second addition of butadiene is made at about 70° C., followed by a 34 Kg line flush with solvent. After another 20 minutes, the third addition of styrene is made and the polymerization continues for a final 20 minutes. At this point 114 grams of 2-propanol is added to terminate the reaction.

This general procedure is used to produce Examples 1–2, as listed below, with the only modifications being the percentages and Mn's of polystyrene and polybutadiene, wherein obtaining such modifications are well known by those skilled in the art.

These block copolymers are then hydrogenated such that all of the polybutadiene blocks and polystyrene blocks are completely saturated.

II) Hydrogenation

Approximately 20 grams of a dried block copolymer is dissolved in 700 mL cyclohexane. This polymer is hydrogenated using a Pt on SiO2 hydrogenation catalyst as described in U.S. Pat. No. 5,612,422. The polymer to catalyst ratio is 10 to 1. The hydrogenation reaction is conducted in a PPI (Precision Pressure Industry) reactor for 12 hours at 177° C. under 3447 MPa hydrogen.

Example 1

Hydrogenated SBSBS (S is polystyrene, B is polybutadiene) copolymer having Mn of 63,000, 65 percent Hydrogenated Polystyrene total, having the following Mn architecture:

[S 14,000]-B 12,000-[S 6,000]-B 12,000-[S 16,000]
End blocks >2x the center block

Example 2

Hydrogenated SBSBS copolymer having Mn of 61,000, 62 percent Hydrogenated Polystyrene total, having the following Mn architecture:

[S 7,000]-B 12,000-[S 19,000]-B 11,000-[S 9,000]
Comment: Center block >2x the end blocks Comparative Example (CE). Hydrogenated SBSBS copolymer having Mn of 63,000, 64 percent Hydrogenated Polystyrene total, having the following Mn architecture:

[S 13,000] B 12,000 [S 13,000] B 12,000 [S 13,000]
Comment: All styrene blocks are the same Mn.

TABLE 1

Mechanical Properties

| Example | Modulus (MPa) | Tensile Strength (MPa) | Yield Strain (percent) | Strain at Break (percent) | Notched Izod (J/m) | Unnotched Izod (J/m) |
|---|---|---|---|---|---|---|
| 1 | 1669 | 31 | 2.4 | 40 | 165.5 | 833 |
| 2 | 1117 | 26 | 6.1 | >50 | 69.4 | No Break |
| CE | 1420 | 29 |  | 24 | 90.7 | 533.8 |

TABLE 2

Thermal Properties

| Example | Tg (° C.) | Tm (° C.) | ΔHm (J/g) | Density (g/mL) | ODT (° C.) |
|---|---|---|---|---|---|
| 1 | 146 | 85.8 | 27 | 0.936 | 310 |
| 2 | 142 | 91.0 | 15 | 0.934 | 260 |
| CE | 140 | 92.6 | 25 | 0.928 | 210 |

Observations:

Examples 1 and 2, have surprisingly improved toughness when compared to symmetrical pentablocks of similar composition and molecular weight.

Experimental Methods:

Modulus, tensile strength, yield strain, and strain-at-break are found according to ASTM D638-99 using Type V samples. Notched Izod and unnotched Izod values are found according to ASTM D256-97.

Glass transition temperature (Tg) is determined via dynamic mechanical spectroscopy. A rectangular specimen approximately 2 mm thick, 1 cm wide, and 5 cm long is subjected to an oscillating three-point bend during heating. The sample oscillated at a frequency of 1 rad/sec, a strain amplitude of 1 percent, and the sample is heated at a rate of 1° C./min. While the material is oscillated, the response of the material is measured by a force transducer. The glass transition temperature is determined to be the temperature at which the phase shift of the response of the material with respect to the stimulating oscillations is at a maximum.

The order-disorder temperature (ODT) is determined via dynamic mechanical spectroscopy. A circular specimen approximately 2 mm thick and 25 mm in diameter is subjected to oscillating shear during heating. The sample oscillated at frequencies ranging from 0.1 to 100 rad/sec, with a strain amplitude of 2 percent. The response of the material to stimulated oscillations is measured every 10° C. increments. The ODT is determined to be the temperature at which the in-phase response of the material had a significantly increased dependence on frequency, and the temperature where the in-phase response is significantly decreased at lower frequencies.

Melting point (Tm) and enthalpy of melting (ΔHm) are found via differential scanning calorimetry. Powdered sample is heated at a rate of 10° C./min while the amount of heat flow to the sample (as compared to a calibrated standard) is measured. The melting point is determined to be the temperature at which the heat flow to the sample reached a minimum. The enthalpy of melting is determined as the amount of heat evolved from the sample compared to the baseline for the sample.

Density is determined by a Helium Pycnometer.

What is claimed is:

1. An alternating hydrogenated block copolymer of the structure ABA'BA, wherein A and A' are hydrogenated vinyl aromatic polymer blocks and B is a conjugated diene polymer block, characterized in that A' differs from the Mn of A by a factor of at least 1.5, and A and A' have a hydrogenation level of greater than 90 percent and B blocks have a hydrogenation level of greater than 99 percent.

2. The hydrogenated copolymer of claim 1, wherein the Mn of hydrogenated vinyl aromatic block A' is at least 1.5 times that of hydrogenated vinyl aromatic blocks A.

3. The hydrogenated copolymer of claim 1, wherein the Mn of hydrogenated vinyl aromatic blocks A are at least 1.5 times that of hydrogenated vinyl aromatic block A'.

4. The hydrogenated copolymer of claim 1, wherein the hydrogenated vinyl aromatic polymer is hydrogenated polystyrene.

5. The hydrogenated copolymer of claim 1, wherein the hydrogenated conjugated diene polymer is a hydrogenated polybutadiene.

6. The hydrogenated copolymer of claim 1, wherein the hydrogenated conjugated diene polymer is a hydrogenated polyisoprene.

7. The hydrogenated copolymer of claim 1, wherein one hydrogenated conjugated diene polymer block is a hydrogenated polybutadiene and one hydrogenated conjugated diene polymer block is hydrogenated polyisoprene.

8. The hydrogenated copolymer of claim 1 comprising from 50 to 85 weight percent hydrogenated vinyl aromatic polymer, based on the total weight of the block copolymer.

9. A fabricated article produced from a composition comprising the polymer of claim 1.

10. An injection molded article produced from a composition comprising the polymer of claim 1.

11. An extruded article produced from a composition comprising the polymer of claim 1.

12. An optical media disc produced from a composition comprising the polymer of claim 1.

* * * * *